(No Model.)

J. McMAHON.
WHEEL HUB.

No. 439,035. Patented Oct. 21, 1890.

Witnesses:
Walter S. Wood
Belle C. Freeman

Inventor.
James McMahon
By Lucius C. West
Att'y.

UNITED STATES PATENT OFFICE.

JAMES McMAHON, OF KALAMAZOO, MICHIGAN.

WHEEL-HUB.

SPECIFICATION forming part of Letters Patent No. 439,035, dated October 21, 1890.

Application filed July 26, 1890. Serial No. 359,996. (No model.)

*To all whom it may concern:*

Be it known that I, JAMES MCMAHON, a subject of Queen Victoria, residing at Kalamazoo, county of Kalamazoo, State of Michigan, have invented a new and useful Wheel-Hub, of which the following is a specification.

This invention consists in a wheel-hub of a peculiar construction, in which said hub has detachable end portions, which form the only bearings upon the axle.

Figure 1:
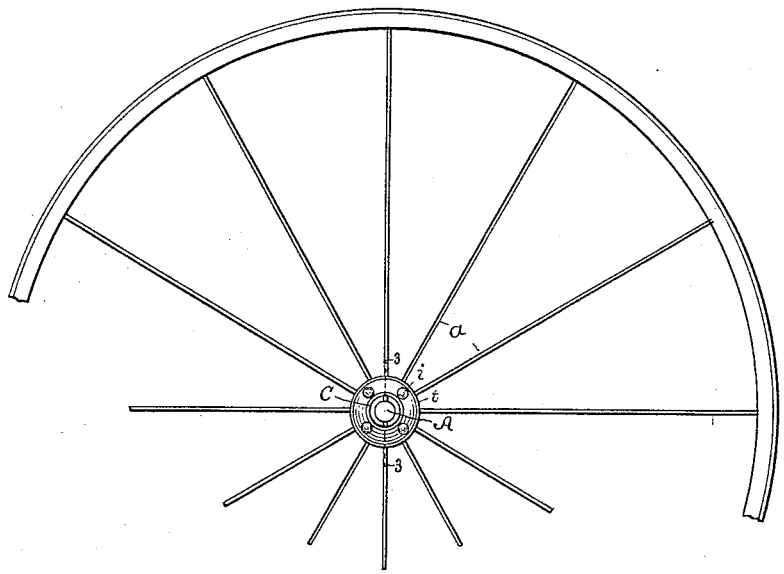
Figure 2:
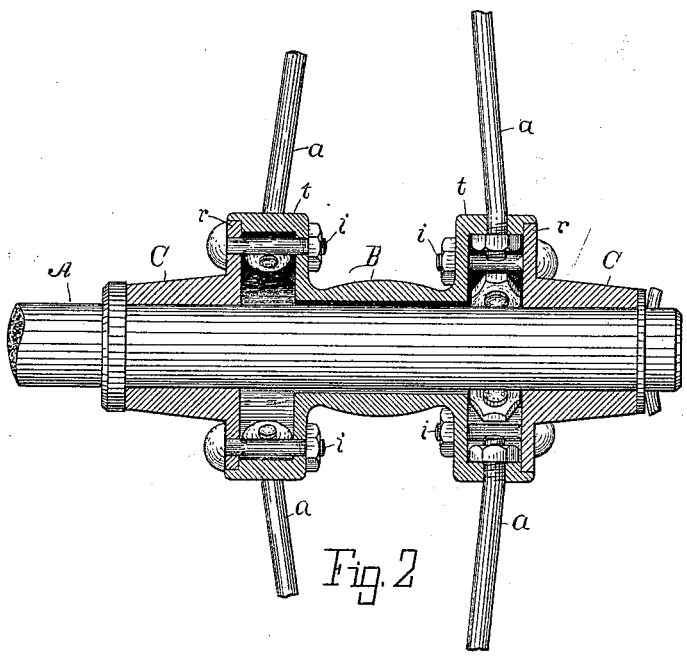

In the drawings forming a part of this specification, Figure 1 is a broken side elevation; and Fig. 2 is an enlarged section on line 3 3 in Fig. 1, looking from a point at the left.

Referring to the lettered parts of the drawings, B is the central portion of the hub, internally larger than the diameter of the axle A, so as not to bear upon said axle. This central portion is provided with end enlargements $t$, internally chambered, so as to be hollow when the end bearing portions C of the hub are in place on the axle A, as in Fig. 2. The flanges $r$ of the parts C are fitted against the end enlargements $t$ and are detachably bolted thereto by bolts $i$. The bolts C of the hub form the bearing portions of the hub upon the axle. By this means should the end of the hub become broken or the bearing portions become unduly worn these parts C can be readily supplied and thus not necessitate the expense of an entire new wheel. The spokes $a$ of the wheel enter the peripherical rim of the end enlargements $t$, where they are provided with a nut, as here shown, or riveted over, as in Fig. 2. Before the parts C are attached to the central part B these nuts of the spokes can be readily screwed up or the ends riveted, as the case may be. So far as the rim of the wheel for which this hub is employed is concerned it may be of any desired and suitable construction.

Just a sufficient portion of a wheel-rim is shown in Fig. 1 to indicate a wheel and the relation of a rim and spokes with this hub.

Having thus described my invention, what I claim as new, and desire to secure by Letters Patent of the United States, is—

A wheel-hub comprising the central portion internally larger than the vehicle-axle, said central portion having the hollow end enlargements internally chambered and open at the ends and the end portions flanged and detachably attached to said end enlargements, so as to close their said open ends, and said end portions forming the only bearings of the hub on the axle, substantially as set forth.

In testimony of the foregoing I have hereunto subscribed my name in presence of two witnesses.

JAMES McMAHON.

Witnesses:
   S. G. EARL,
   W. BANNISTER.